United States Patent
Zimmer et al.

[11] Patent Number: 6,035,675
[45] Date of Patent: Mar. 14, 2000

[54] ELECTROMAGNETICALLY ACTUATED LOCK

[75] Inventors: Markus Zimmer, Dreieilid; Rainer Uhler, Sinsheim; Hans-Peter Schöner, Modautal, all of Germany

[73] Assignee: Daimler Benz Aktiengesellschaft, Stuttgart, Germany

[21] Appl. No.: 09/155,854

[22] PCT Filed: Jan. 20, 1998

[86] PCT No.: PCT/EP98/00286

§ 371 Date: Oct. 5, 1998

§ 102(e) Date: Oct. 5, 1998

[87] PCT Pub. No.: WO98/33686

PCT Pub. Date: Aug. 6, 1998

[30] Foreign Application Priority Data

Feb. 4, 1997 [DE] Germany .......................... 197 04 062

[51] Int. Cl.[7] .................................................. B60R 25/02
[52] U.S. Cl. .................................. 70/186; 70/276; 70/283
[58] Field of Search ............................. 70/186, 252, 282, 70/283, 276; 292/144

[56] References Cited

U.S. PATENT DOCUMENTS

| | | | |
|---|---|---|---|
| 4,250,976 | 2/1981 | Mochida | 180/271 |
| 4,784,415 | 11/1988 | Malavai | 292/144 |
| 5,561,997 | 10/1996 | Milman | 70/283 |
| 5,699,686 | 12/1997 | Neumayer et al. | 70/276 X |
| 5,826,450 | 10/1998 | Lerchner et al. | 70/283 X |
| 5,850,752 | 12/1998 | Lax | 70/276 |

FOREIGN PATENT DOCUMENTS

| | | |
|---|---|---|
| 0185817 | 8/1986 | European Pat. Off. . |
| 3505971A1 | 8/1986 | Germany . |
| 4422435C1 | 7/1995 | Germany . |
| 2193697A | 2/1988 | United Kingdom . |

*Primary Examiner*—Suzanne Dino Barrett
*Attorney, Agent, or Firm*—Venable; George H. Spencer; Catherine M. Voorhees

[57] ABSTRACT

The apparatus is an electromagnetically actuated lock which has a movable part, which is prevented from rotation or displacement by a barring bolt that extends into a recess of the movable part. Locking pins extend into the barring bolt and which locking pins positively lock the bolt in the withdrawn or retracted position when access is authorized and which locking pins also positively lock the bolt in the extended position when access is unauthorized.

6 Claims, 2 Drawing Sheets

ELECTROMAGNETICALLY ACTUATED LOCK

BACKGROUND OF THE INVENTION

The invention relates to an electromagnetic lock as defined in the preamble to claim 1.

In the future use of electronic keys, for example for vehicles, in which the user possesses only an encoded key without a mechanical function (key bit), it is necessary to also replace the purely-mechanical lock function with an electrically-controlled device.

It is known from U.S. Pat. No. 4,784,415 that an electromagnetic lock is provided with a movable part that can be prevented from displacement by a barring bolt, with the barring bolt extending into a recess of the movable part. At least one locking pin extends into the barring bolt, and the locking pin unlocks the barring bolt if access is authorized. Coils that can be supplied with current, and in which the locking pin and barring bolt form the armature, assure the unlocked or locked state of the barring bolt in the event of a power outage. A plurality of locking pins can be provided.

DE-A1 35 05 971 discloses a key for actuating the electromagnetic lock, the key containing contact pins or bridges, by means of which the lock is rendered operable when the key is fully inserted.

SUMMARY OF THE INVENTION

It is the object of the invention to develop a key-lock system that meets increased safety requirements due to potential danger during a malfunction.

This object is accomplished by the features described herein.

DETAILED DESCRIPTION OF THE INVENTION

Figure 1:
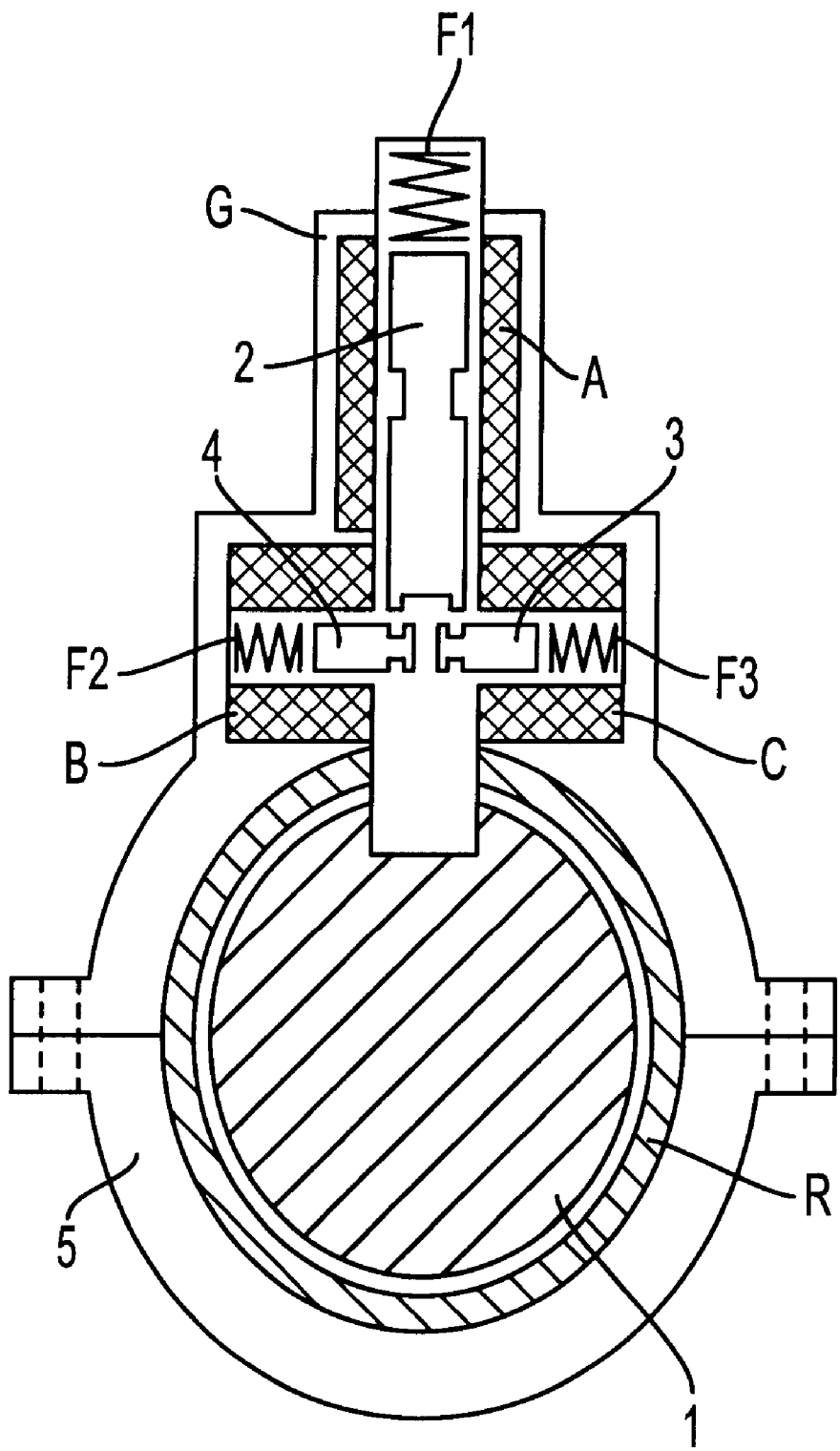
FIG. 1 show an axial section of an electromagnetically actuated lock according to the present invention.

FIG. 1 shows an arrangement similar to the operating principle of magnet valves. The system has three coils A–C, with associated armatures 2, 3, 4, and compression springs F1, F2, F3, which are grouped in a housing (G), and a receptacle 5 (bell) for a secure attachment to, for example, the jacket tube for a guide spindle 1 of a motor vehicle.

In the locked state, a barring bolt 2 extends into a recess of a shaft or guide spindle 1 illustrated in FIG. 1. The barring bolt 2 is additionally held by locking pins 3 and 4. The shaft or guide spindle is thus fixed against rotation. Analogously, the device of the invention can also be used to stop a longitudinally-movable part 1.

For unlocking, first the coils B and C are supplied with current to release the locking pins. Afterward, the barring bolt 2 is withdrawn from the guide spindle 1, and the guidance is enabled, through the supply of the coil A with current. The coils B and C are shut off, so the locking pins 3 and 4 are returned to their inoperative positions, which prevents an undesired engagement of the barring bolt 2 with the guide spindle 1. As soon as the current through coil A is shut off, the barring bolt additionally locks the two locking pins. This provides a three-fold protection against unintentional blocking of the guidance.

For locking the guide spindle 1, the coil A and coils B and C must be excited consecutively. Afterward, the current in coil A is shut off first, followed by the current in coils B and C. The guidance is in the locked state after the barring bolt 2 latches in the recess of the guide spindle 1.

The position of the locking pins and the barring bolt can be permanently monitored through the measurement of the inductances by the associated control electronics.

Figure 2:
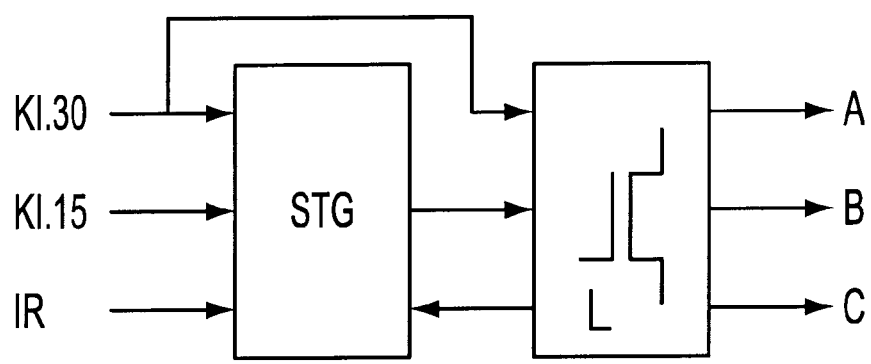
FIG. 2 shows an electrical circuit associated with the electromagnetically actuated lock according to the invention.

FIG. 2 shows the associated electrical circuit. The coils A–C are controlled by way of a power output stage L, which for its part detects the electrical coil values and conducts them to the process control STG. The control signals are generated by the process control as a function of the locking-pin and barring-bolt position, on the one hand, and the requests from the vehicle, on the other hand. The level of the continuous-current supply at Kl.30, the message "ignition on" at Kl. 15 and the status of the infrared closing system IR are provided as input signals.

For increased security, it is advantageous to provide more than two locking pins.

While the invention has been disclosed in this patent application by reference to the details of preferred embodiments of the invention, it is to be understood that the disclosure is intended in an illustrative, rather than in a limiting sense, as it is contemplated that modifications will readily occur to those skilled in the art, within the spirit of the invention and the scope of the appended claims

What we claim is:

1. An electromagnetically-actuated lock comprising:
   a rotatable and longitudinally movable part having a recess;
   a barring bolt that extends into the recess of the movable part and prevents the movable part from rotation and longitudinal displacement, said barring bolt having a first position and a second position;
   locking pins which can extend into the barring bolt and stop the barring bolt in the first and second positions, the barring bolt and locking pins being electromagnetically actuated; and
   a plurality of electromagnets including a first coil that can be supplied with current and the barring bolt serving as the armature of the first coil, and second and third coils that can be supplied with current and respective one of the locking pins serves as the armature of the second and third coils, wherein, in the first position of the barring bolt, the locking pins lock the barring bolt into the recess of the movable part, and in the second position, the barring bolt is withdrawn from the recess and additionally locks the locking pins in an unlocked position when the first coil is not supplied with current.

2. The lock according to claim 1, further comprising a control electronics with a process control (STG) for permanent monitoring of the position of the barring bolt and the locking pins through the measurement of the inductances of the first, second and third coils.

3. The lock according to claim 1, wherein an electronic "AND" link is provided in a process control (STG) for motor vehicles so that the current supply for the second and third coils of the locking pins can be clocked when the ignition is on.

4. The lock according to claim 1, wherein more than two locking pins are provided.

5. The lock according to claim 1, wherein a key that can be inserted into the lock contains contact bridges for supplying the first, second and third coils with current.

6. An electromagnetically-actuated lock comprising:

a rotatable and longitudinally movable part having a recess;

a barring bolt that can extend into the recess of the movable part preventing the movable part from rotational and longitudinal displacement, said barring bolt having a first position and a second position, said barring bolt further having a first indentation and a second indentation;

locking pins which can extend into the barring bolt and stop the barring bolt in the first and second positions, the barring bolt and locking pins being electromagnetically actuated; and a plurality of electromagnets including a first coil that can be supplied with current and the barring bolt serving as the armature of the first coil, and second and third coils that can be supplied with current and respective one of the locking pins serves as the armature of the second and third coils, wherein, in the first position of the barring bolt, the locking pins lock the barring bolt into the recess of the movable part by engaging said first and second indentations of the barring bolt respectively, and wherein, in the second position, after the barring bolt is withdrawn from the recess, the locking pins are returned to the engaged position under the barring bolt and when the first coil ceases to be supplied with current, said barring bolt additionally locks the locking pins in an unlocked position preventing unintentional blocking by the barring bolt of the moving part.

* * * * *